(12) United States Patent
Crooks et al.

(10) Patent No.: US 11,244,301 B2
(45) Date of Patent: Feb. 8, 2022

(54) MOBILE CART RECONCILIATION

(71) Applicant: Diebold Nixdorf Incorporated, North Canton, OH (US)

(72) Inventors: Edward Crooks, Copley, OH (US); David William Kuchenski, Tallmadge, OH (US)

(73) Assignee: Diebold Nixdorf, Incorporated, North Canton, OH (US)

( * ) Notice: Subject to any disclaimer, the term of this patent is extended or adjusted under 35 U.S.C. 154(b) by 121 days.

(21) Appl. No.: 16/373,062

(22) Filed: Apr. 2, 2019

(65) Prior Publication Data
US 2020/0320505 A1    Oct. 8, 2020

(51) Int. Cl.
| G06Q 40/00 | (2012.01) |
| G06Q 20/32 | (2012.01) |
| G06Q 20/20 | (2012.01) |
| G06Q 30/06 | (2012.01) |

(52) U.S. Cl.
CPC ....... *G06Q 20/3227* (2013.01); *G06Q 20/206* (2013.01); *G06Q 30/0603* (2013.01); *G06Q 30/0641* (2013.01)

(58) Field of Classification Search
CPC ............. G06Q 20/3227; G06Q 20/206; G06Q 30/0603; G06Q 30/0641
See application file for complete search history.

(56) References Cited

U.S. PATENT DOCUMENTS

| 4,929,819 | A | * | 5/1990 | Collins, Jr. | ............. | A47F 9/047 |
| | | | | | | 235/383 |
| 6,431,444 | B1 | * | 8/2002 | Gatto | ...................... | A47F 9/048 |
| | | | | | | 235/375 |
| 7,341,185 | B1 | * | 3/2008 | Arrington | ............... | G06Q 10/08 |
| | | | | | | 235/383 |
| 7,620,568 | B1 | * | 11/2009 | Parker-Malchak | .......................... |
| | | | | | | G06Q 10/087 |
| | | | | | | 235/375 |
| 8,239,268 | B2 | * | 8/2012 | Iizaka | .................... | G07G 3/006 |
| | | | | | | 705/16 |

(Continued)

FOREIGN PATENT DOCUMENTS

| CN | 102306432 | * | 1/2012 | ............. G06Q 20/18 |
| EP | 3001357 A1 | | 3/2016 | |

(Continued)

OTHER PUBLICATIONS

Ning, "Design of Fast Supermarket Shopping based on Internet of Things," 2017 International Conference on Robots and Intelligent Systems, 2017 (Year: 2017).*

(Continued)

*Primary Examiner* — Alexander G Kalinowski
*Assistant Examiner* — William B. Bunker
(74) *Attorney, Agent, or Firm* — Black, McCuskey, Souers & Arbaugh, LPA

(57) ABSTRACT

Disclosed herein is a method where a consumer employs a device associated with the user to scans tags associated with items for purchase. The consumer can pay for the items using the device associated with the user. A point of sale ("POS") terminal or other such device associated with the merchant scans tags associated with items associated with the user and reconciles the items scanned by the device associated with the user with the items scanned by the device associated with the merchant.

5 Claims, 10 Drawing Sheets

(56) References Cited

U.S. PATENT DOCUMENTS

| | | | |
|---|---|---|---|
| 10,266,196 B1* | 4/2019 | Sinha | G06Q 99/00 |
| 2005/0017068 A1* | 1/2005 | Zalewski | G06Q 20/3552 |
| | | | 235/380 |
| 2010/0140351 A1* | 6/2010 | Trenciansky | G08B 13/2485 |
| | | | 235/383 |
| 2011/0145051 A1 | 6/2011 | Paradise et al. | |
| 2012/0062367 A1 | 3/2012 | Warther | |
| 2013/0103537 A1* | 4/2013 | Hewett | G06Q 30/0633 |
| | | | 705/26.7 |
| 2013/0254114 A1* | 9/2013 | Smith | G06Q 20/20 |
| | | | 705/67 |
| 2014/0058946 A1* | 2/2014 | Paranjape | G06Q 20/322 |
| | | | 705/44 |
| 2015/0025969 A1* | 1/2015 | Schroll | G06Q 20/208 |
| | | | 705/14.53 |
| 2015/0134470 A1* | 5/2015 | Hejl | G07G 1/0081 |
| | | | 705/21 |
| 2017/0046707 A1* | 2/2017 | Krause | G06Q 20/4016 |
| 2017/0161703 A1* | 6/2017 | Dodia | G06K 19/06028 |
| 2017/0206516 A1* | 7/2017 | Watson | G06Q 20/208 |
| 2018/0096567 A1* | 4/2018 | Farrow | G06Q 20/4016 |
| 2020/0050813 A1* | 2/2020 | Bonner | H04W 4/029 |

FOREIGN PATENT DOCUMENTS

| | | | |
|---|---|---|---|
| EP | 3109838 A1 | 12/2016 | |
| WO | WO-2016178146 A1 * | 11/2016 | G06Q 20/18 |

OTHER PUBLICATIONS

Bobbit et al., "Visual Item Verification of Fraud Prevention in Retail Self-Checkout," IBM T.J. Watson Research, IEEE, 2010 (Year: 2010).*

Anonymous, "Self-Checkout in Retail: Measuring the Loss," ECR Community (Efficient Consumer Response), Shrinkage and OSA Group, 2017 (Year: 2017).*

Written Opinion of the International Searching Authority filed in the corresponding PCT Application; 6 pages.

International Search Report filed in the corresponding PCT Application; 3 pages.

* cited by examiner

US 11,244,301 B2

MOBILE CART RECONCILIATION

TECHNICAL FIELD

The present disclosure relates generally to point of sale systems and methods.

BACKGROUND

Typical point of sale systems, such as are frequently employed by retailers, require a customer to wait in line for an available clerk. The clerk empties the contents of their cart and each item purchased is scanned one at a time (or once per type of item) at a checkout (point of sale or "POS") terminal. There are several problems with this process. Waiting for an available clerk can cause a bottleneck, especially if staffing levels are insufficient. The process of scanning individual items is time consuming. In addition, the consumer may not be aware of the total price of items in their cart and may not have sufficient funds to pay for them causing embarrassment to the consumer.

SUMMARY

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein a method where a consumer employs a device associated with the user to scans tags associated with items for purchase. The consumer can pay for the items using the device associated with the user. A point of sale ("POS") terminal or other such device associated with the merchant scans tags associated with items associated with the user and reconciles the items scanned by the device associated with the user with the items scanned by the device associated with the merchant. Further embodiments include methods, apparatus, and computer readable mediums of instructions with instructions for implementing the methodologies described herein.

BRIEF DESCRIPTION OF THE DRAWINGS

The accompanying drawings incorporated herein and forming a part of the specification illustrate the example embodiments.

DESCRIPTION OF EXAMPLE EMBODIMENTS

Figure 1:
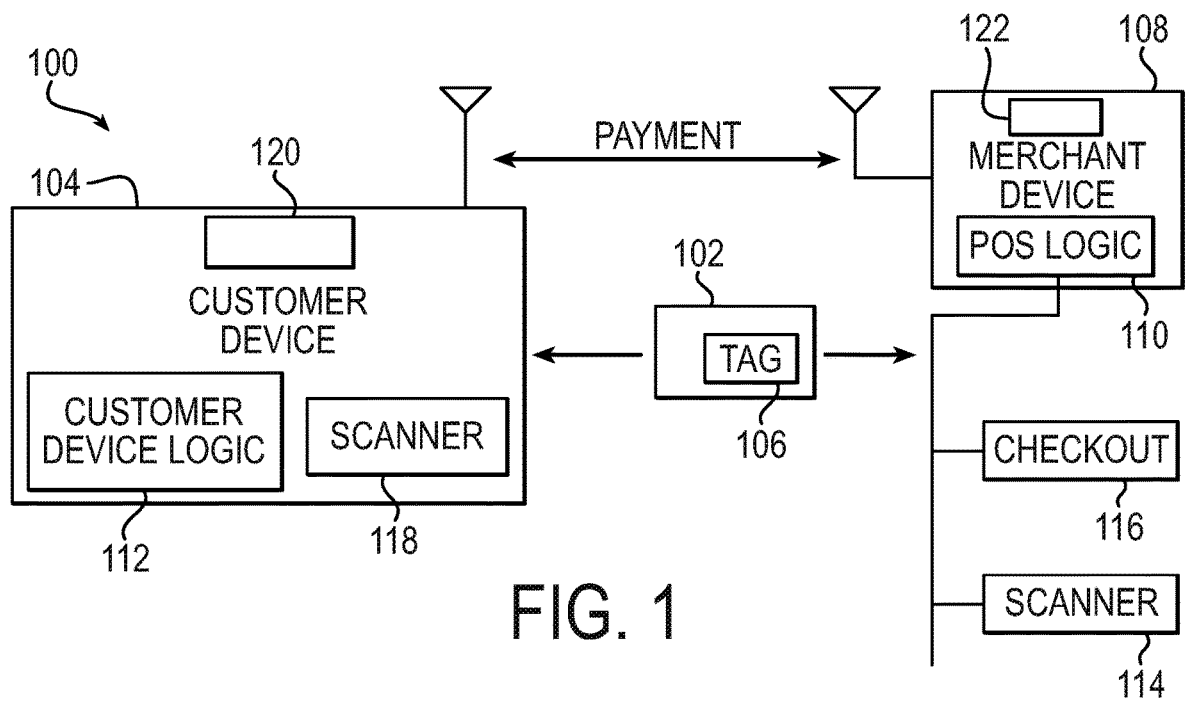
FIG. 1 is a block diagram of a system for purchasing an item that employs a mobile cart and a reconciliation of the mobile cart with the physical cart.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

FIG. 1 is a block diagram of a system 100 for purchasing an item 102 that employs a "mobile cart" and a reconciliation of the mobile cart with a "physical cart." The customer (not shown) employs a customer device 104 to scan a tag 106 associated with the item 102 for purchase. The customer may employ the customer device 104 to pay for the item. The customer then proceeds to checkout. A merchant device 108 associated with the merchant scans the tag 106 associated with the item 102. Merchant device logic 110 in the merchant device 108 communicates with customer device logic 112 in the customer device 104 to reconcile the item scanned by the consumer device 104 with the item scanned by the merchant device 108. If the item 102 scanned by the customer device 104 matches the item 102 scanned by the merchant device 108, then the merchant device 108 accepts payment from customer device 104.

The items scanned by the customer device 104 may be referred to herein as the mobile cart. The items scanned by the merchant device 108 may be referred to herein as the physical cart. In an example embodiment, the customer device 104 is a mobile device associated with the customer. For example, the customer device 104 may be a smartphone.

In an example embodiment, the customer device 104 comprises customer device logic 112, a scanner 118, and a wireless transceiver 120. The customer device logic 112 is operable to control the operation of the device and implement the functionality described herein. "Logic", as used herein, includes but is not limited to hardware, firmware, software and/or combinations of each to perform a function (s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software that performs the desired functionality when executed by a processor.

The scanner 118 is operable to scan the tag 106 of item 102. In an example embodiment, the scanner 118 is an optical scanner. For example, scanner 118 may be operable to scan a bar code, or a quick response (QR) code, a Universal Product Code (UPC), or any combination of two or more of a bar code, QR code, and UPC code. In another example embodiment, the scanner 118 is operable to scan an infra-red (IR) tag. In still another example embodiment, the scanner 118 is a wireless scanner, such as a Radio Frequency Identification (RFID) scanner. For example, the scanner 118 is operable to employ a contactless protocol such as near field communication (NFC), a personal area network protocol such as BLUETOOTH, wireless local area network protocol such as WI-FI, or a combination of two or more wireless protocols such as NFC, BLUETOOTH, and WIFI. In particular embodiments, the scanner 118 is operable to scan a combination of two or more of optical, IR, and RFID tags.

The wireless transceiver 120 may employ a wireless protocol such as WI-FI or cellular data for communicating with the merchant device 108. As will be described in more detail herein, the wireless transceiver 120 can be employed by customer device logic 112 to obtain pricing information for item 102, provide data representative of scanned items, and/or provide payment information.

The item 102 may be any item that the merchant is offering for sale. The tag 104 may comprise any suitable tag that scan be scanned, including but not limited to, active, passive, semi-passive RFID, NFC, infra-red tag, optical (e.g., UPC). In an example embodiment, the tag may comprise two or more types of tags (e.g., a UPC tag and a BLUETOOTH tag) which may be joined together in one tag or be implemented in two separate tags.

In an example embodiment, each item 102 has a tag 106 that is unique to that item. In another example embodiment, like items may have like tags (e.g., 12 ounce boxes of Lucky Charms may have tags that provide the same data that is different from tags on 24 ounce boxes of Lucky Charms or any other type of cereal).

In an example embodiment, the merchant device 108 is located in a checkout area 116 of the merchant's establishment. The merchant device 108 comprises merchant device (or point of sale "POS") logic 110 for providing the functionality described herein, a wireless transceiver 122 for communicating with the customer device 104, and a scanner 114. The wireless transceiver may employ any suitable protocol such as WIFI. The scanner 114 may employ any suitable protocol for scanning item 102. For example, the scanner may suitably comprise any one or more of the optical, IR, and wireless scanners described herein.

Although not shown, those skilled in the art car readily appreciate the merchant device 108 may be coupled with devices to indicate to the customer whether a transaction was approved or not approved. For example, the merchant device may be coupled with a gate that opens when the transaction is approved. As another example, the merchant device 108 may be coupled with one or more lights to indicate whether a transaction was approved (e.g., yellow means in progress, green means approved, and red means not approved or a problem has been encountered).

In an example embodiment, when a customer desires to purchase an item 102, the customer employs scanner 118 to scan the tag 106 associated with item 102 and obtain data representative of the item 102. Customer device logic 112 determines a price for the item 102 based on the data representative of the item obtained from tag 106. In an example embodiment, the price may be included with the data representative of the item obtained by scanner 118 from tag 106. In another example embodiment, the customer device logic 112 employs wireless transceiver 120 to communicate with the merchant device 108 to obtain a price for the item. In an example embodiment, when the customer is done shopping, customer device logic 112 sends payment information via wireless transceiver 120 to merchant device 108. As the customer enters checkout area 116, the scanner 114 associated merchant (or point of sale) device 108 scans tag 106 of item 102. The merchant device 108 also obtains data representative of item 102 and payment information from the customer device 104 via wireless interface 122.

The merchant device logic 110 verifies (reconciles) the data representative of the item 102 scanned by the (e.g., mobile) customer device 104 associated with the customer (the mobile cart) matches the data representative of the item 102 scanned by the (e.g., point of sale) merchant device 108 associated with the merchant (the physical cart). If the mobile cart does not match the physical cart, the merchant device logic 110 may cause corrective actions to be taken. For example, the merchant device 108 may comprise a display which can show a comparison of the mobile cart and physical cart to facilitate reconciliation. As another example, the merchant device logic 110 may provide the data representative of the physical cart to the customer device 104 to enable the customer to employ the customer device 104 to reconcile the mobile cart and physical cart. In particular embodiments, the merchant device logic 110 may notify a merchant employee of the problem.

Upon successfully reconciling the mobile cart with the physical cart, the (point of sale) merchant device 108 accepts payment from the (mobile) customer device 104 associated with the customer. In an example embodiment, the customer device 104 may obtain payment information prior to the customer approaching the checkout area 116 and/or the merchant device 108 scanning the tag 106 of item 102. As those skilled in the art can readily appreciate, obtaining payment information prior to the customer approaching the checkout area 116 and/or prior to the merchant device 108 scanning the tag of item 102 can help minimize the amount of time the customer has to remain in the checkout area 116.

In particular embodiments, the customer device 104 may obtain the payment after the mobile cart and physical cart have been reconciled.

In an example embodiment, the customer device logic 112 may obtain data representative of coupons in the customer's possession via customer device scanner 118. Coupon information may be presented to the merchant device 108 as part of the payment for the item 102.

Figure 2:
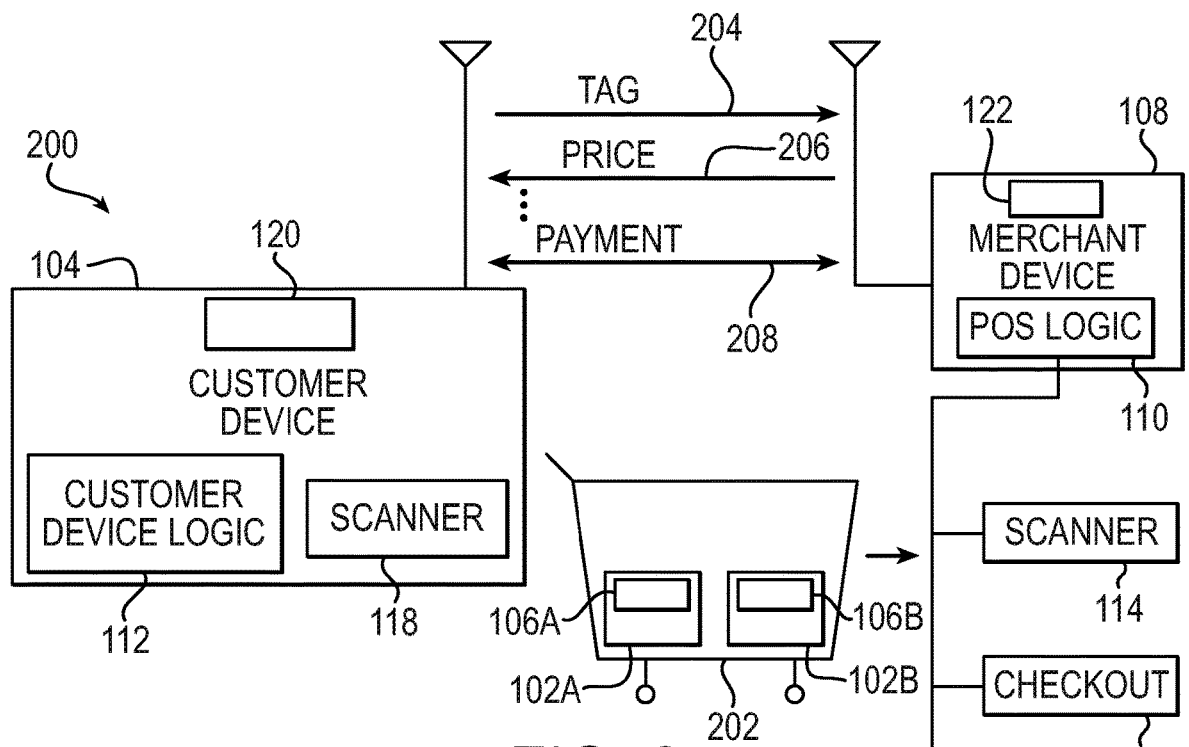
FIG. 2 is a block diagram illustrating an example of a system for purchasing a plurality of items.

FIG. 2 is a block diagram illustrating an example of a system 200 for purchasing a plurality of items 102A, 102B. In this example, the customer has placed the items into a cart 202. However, those skilled in the art should readily appreciate that the principles described herein are applicable to situations where the customer does not use a cart 202 (e.g., the customer carries the items to checkout area 116).

As in FIG. 1, the customer scans tags 106A, 106B associated with items 102A and 102B respectively with customer device scanner 118 associated with customer device 104. Although in the present example the customer device 104 is shown and described as being separate from cart 202, those skilled in the art can readily appreciate that in some embodiments the customer device 104 can be embodied into cart 202.

In an example embodiment, pricing information may be embodied in tag 106A and/or 106B. In an example embodiment, where pricing information is not embodied on tag 106A and/or 106B, the customer device logic 112 can cause wireless transceiver 120 to communicate (e.g., send data representative of the item obtained from the tag) with the wireless transceiver 122 associated with the merchant device 108 or another device associated with the merchant to obtain the price of item 102A and/or 102B as illustrated by 204. The merchant device (or other device associated with the merchant) responds with the pricing information as illustrated by 206. In an example embodiment where pricing information is included on the tag 106A and/or 106B, the customer device logic 112 may communicate with merchant device 108 to verify pricing information. For example, the customer may entitled to a discount (e.g., for being a member of a loyalty program) which may not be present on tags 106A and/or 106B. By communicating with merchant device 108, the customer device logic 112 may obtain data about discounts. In an example embodiment, the merchant device 108 determines whether the customer is entitled to discounts and sends data representative of any available discounts to customer device 104.

Upon the customer indicating they have completed making their purchase, the customer device 104 obtains payment information from the customer (which as described herein supra may include coupon data). Similar to the example in FIG. 1, payment information may be provided by the customer at any time (e.g., before, during, or after) the customer approaches the checkout area 116 and/or the cart (physical cart) 202 is scanned by scanner 114.

The merchant device logic 110 verifies (reconciles) the data representative of the item scanned by the (e.g., mobile) customer device 104 associated with the customer (the mobile cart) matches the data representative of the items 102A, 102B scanned by the (e.g., point of sale) merchant device 108 associated with the merchant (the physical cart). If the mobile cart does not match the physical cart, the merchant device logic 110 may cause corrective actions to be taken. For example, the merchant device 108 may comprise a display which can show a comparison of the mobile cart and physical cart to facilitate reconciliation. As another example, the merchant device logic 110 may provide the data representative of the physical cart to the customer device 104 to enable the customer to employ the customer device 104 to reconcile the mobile cart and physical cart. In particular embodiments, the merchant device logic 110 may notify a merchant employee of the problem.

Upon successfully reconciling the mobile cart with the physical cart, the (point of sale) merchant device 108 accepts payment from the (mobile) customer device 104 associated with the customer as indicated by 208. As those skilled in the art can readily appreciate, the payment process may entail the exchange of one or more messages between the customer device 104 and the merchant device 108. For example the customer device may send payment information to the merchant device 108 and the merchant device may send a signal to the customer device 102 indicating whether the payment was accepted. In an example embodiment, the customer device 104 may obtain payment information prior to the customer approaching the checkout area and/or the merchant device 108 scanning the tags 106A, 106B associated with items 102A, 102B respectively, however, in particular embodiments, the customer device 104 may obtain the payment after the mobile cart and physical cart have been reconciled.

In an example embodiment, the customer device logic 112 may obtain data representative of coupons in the customer's possession via customer device scanner 118. Coupon information may be presented to the merchant device 108 as part of the payment for the item 102.

Although the examples just presented illustrates two items being purchased, those skilled in the art should readily appreciate that the number of items chosen for this example were chosen for ease of illustration and that the principles described herein may be applied to any physically realizable number of items. Thus, the example embodiments described herein should not be construed as limited to the number of items provided in the examples described herein.

Figure 3:
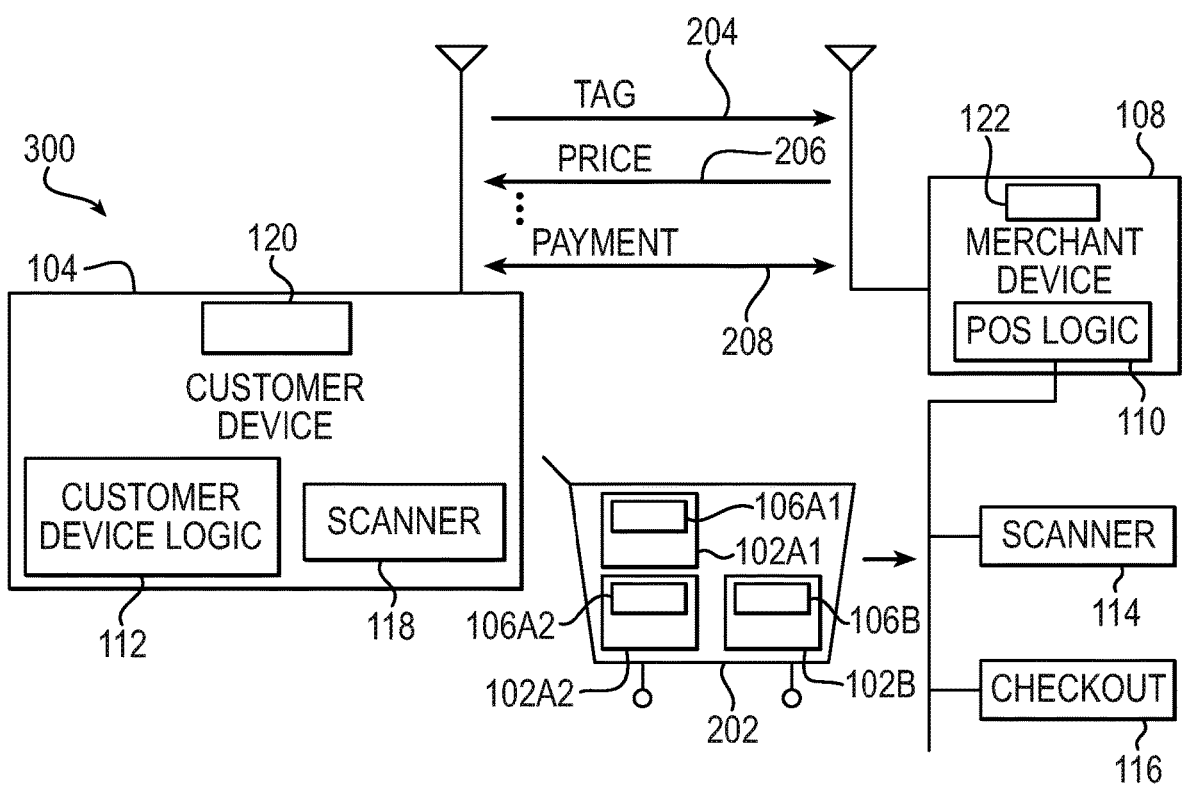
FIG. 3 is a block diagram illustrating an example of a system for purchasing a plurality of items, where more than of a particular item is purchased.

FIG. 3 is a block diagram illustrating an example of a system 300 for purchasing a plurality of items, where more than of a particular item is purchased. In the illustrated example, more than one of item 102A, designated as 102A1 and 102A2 are purchased. In this example, the customer has placed the items 102A1, 102A2, and 102B into a cart 202. However, those skilled in the art should readily appreciate that the principles described herein are applicable to situations where the customer does not use a cart 202 (e.g., the customer carries the items to checkout area 116).

In an example embodiment, tags 106A1, 106A2 for like items (e.g., 102A1 and 102A2) are the same. Thus, the tags 106A1, 106A2 provide the same data when scanned.

In an example embodiment, each tag 106A1, 106A2, and 106B has a unique code. For example, even though tags 106A1 and 106A2 are on a like item (e.g., a hammer), the data on each tag is different.

As in FIGS. 1 and 2, the customer scans tags 106A1, 106A2, and 106B associated with items 102A1, 102A2, and 102B respectively with customer device 104. Although in the present example the customer device 104 is shown and described as being separate from cart 202, those skilled in the art can readily appreciate that in some embodiments the customer device 104 can be embodied into cart 202.

In an example embodiment, pricing information may be embodied in tags 102A1, 102A2, and/or 102B. In an example embodiment, where pricing information is not embodied on tags 102A1, 102A2, and/or 102B, the customer device logic 112 can cause wireless transceiver 120 to communicate (e.g., send data representative of the item obtained from the tag) with the wireless transceiver 122 associated with the merchant device 108 or another device associated with the merchant to obtain the price of item 102A1, 102A2, and/or 1028 as illustrated by 204. The merchant device (or other device associated with the merchant) responds with the pricing information as illustrated by 206. In an example embodiment where pricing information is included on the tags 1106A1, 106A2, and/or 106B of items 102A1, 102A2, and/or 102B respectively, the customer device logic 112 may communicate with merchant device 108 to verify pricing information. For example, the customer may entitled to a discount (e.g., for being a member of a loyalty program) which may not be present on tags 102A1, 102A2, and/or 102B. By communicating with merchant device 108, the customer device logic 112 may obtain data about discounts.

Upon the customer indicating they have completed making their purchase, the customer device 104 obtains payment information from the customer (which as described herein supra may include coupon data). Similar to the examples in FIGS. 1 and 2, payment information may be provided by the customer at any time (e.g., before, during, or after) the customer approaches the checkout area 116 and/or the cart (physical cart) 202 is scanned by scanner 114.

The merchant device logic 110 verifies (reconciles) the data representative of the item scanned by the (e.g., mobile) customer device 104 associated with the customer (the mobile cart) matches the data representative of the items 102A1, 102A2, and 102B scanned by the (e.g., point of sale) merchant device 108 associated with the merchant (the physical cart). If the mobile cart does not match the physical cart, the merchant device logic 110 may cause corrective actions to be taken. For example, the merchant device 108 may comprise a display which can show a comparison of the mobile cart and physical cart to facilitate reconciliation. As another example, the merchant device logic 110 may provide the data representative of the physical cart to the customer device 104 to enable the customer to employ the customer device 104 to reconcile the mobile cart and physical cart. In particular embodiments, the merchant device logic 110 may notify a merchant employee of the problem.

Upon successfully reconciling the mobile cart with the physical cart, the (point of sale) merchant device 108 accepts payment from the (mobile) customer device 104 associated with the customer. In an example embodiment, the customer device 104 may obtain payment information prior to the customer approaching the checkout area and/or the merchant device 108 scanning the tag 106 associated with item 102, however, in particular embodiments, the customer device 104 may obtain the payment after the mobile cart and physical cart have been reconciled.

In an example embodiment, the customer device logic 112 may obtain data representative of coupons in the customer's possession via customer device scanner 118. Coupon information may be presented to the merchant device 108 as part of the payment for the item 102.

Although the examples just presented illustrates two items being purchased, those skilled in the art should readily appreciate that the number of items chosen for this example were chosen for ease of illustration and that the principles described herein may be applied to any physically realizable number of items. Thus, the example embodiments described herein should not be construed as limited to the number of items provided in the examples described herein.

Figure 4:
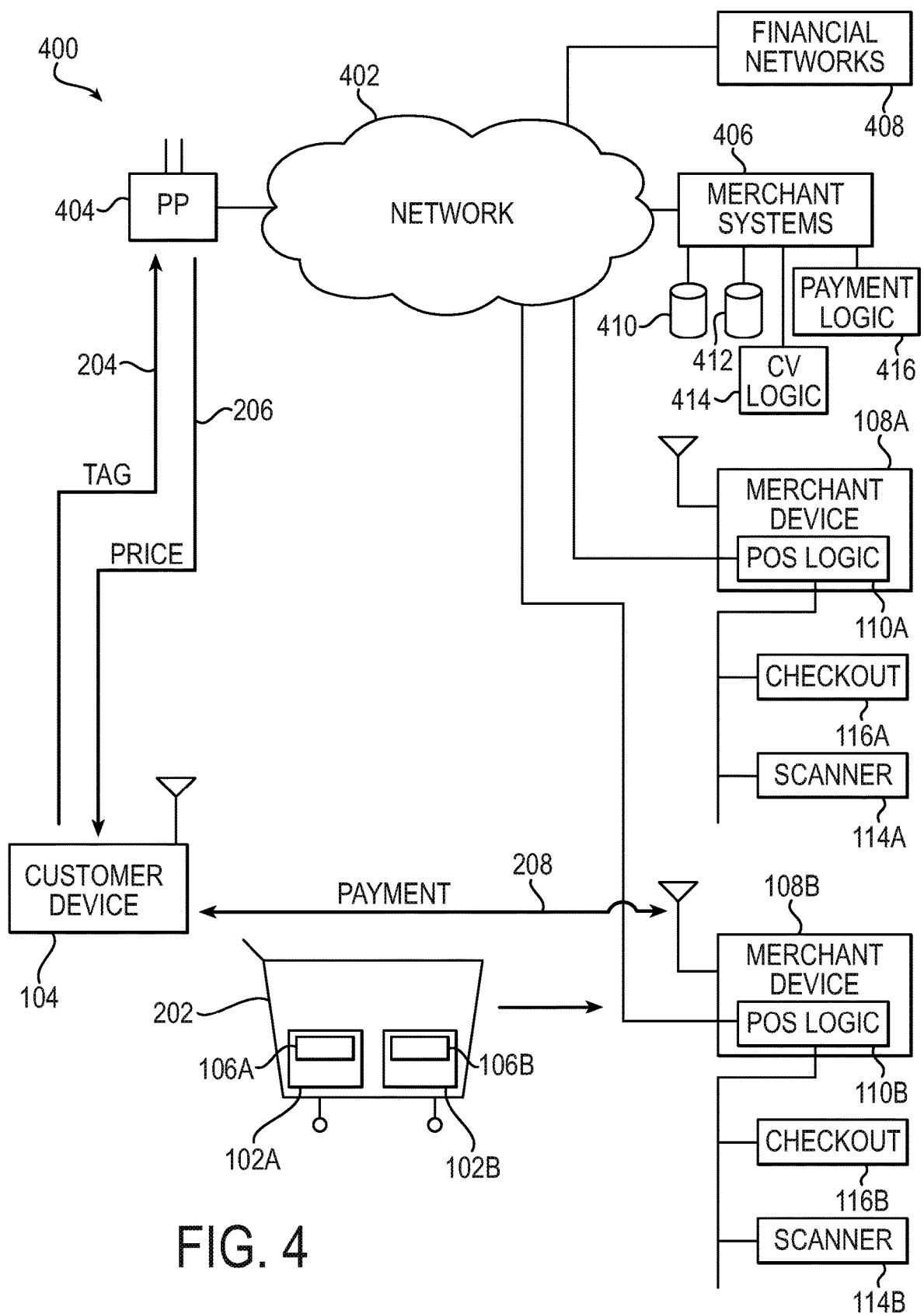
FIG. 4 is a block diagram illustrating a more detailed example of a system that provides for mobile cart reconciliation.

FIG. 4 is a block diagram illustrating a more detailed example of a system 400 that provides for mobile cart reconciliation. In this example, a plurality of merchant devices 108A and 108B are coupled with a network 402. A wireless access point (AP) 404 is coupled to network 404 that enables the access point 404 and the merchant devices 108A, 108B to communicate with additional merchant systems 406. Some examples of additional merchant systems include, but are not limited to, databases 410 that contain product pricing information sorted by tag identification, customer loyalty program data 412, logic 414 for verifying coupons, payment processing logic 416, and any other databases and logic that may be employed by the merchant. In an example embodiment, one or more financial networks 408 are coupled with network 402 that enables payment processing logic 416 to contact customer financial institutions (e.g., banks, credit card companies, etc.) to verify payment and debit the customer's account.

In an example embodiment, one or more wireless access points 404 are distributed in the merchant's establishment allowing customer device 104 to communicate with the merchant. As illustrated in FIG. 4, this can allow the customer device 104 to obtain price information for an item based on tag data. However, those skilled in the art can readily appreciate that the one or more APs 404 may provide many other functions. For example, the merchant can send data representative of specials or discounts to the customer device 104.

In an example embodiment, the customer may choose either merchant device 108A or merchant device 108B for checkout. The customer merely approaches the checkout area 116A or 116 associated with the desired checkout 108A or 108B respectively. As described herein, the scanner associated with the selected checkout area scans the items 102A, 102B in cart 202 (the physical cart) and obtains data representative of the items scanned by customer device 104 (the mobile cart) and if the physical cart and mobile cart match (reconciled), the selected merchant device obtains payment information from the customer device 104. The payment is processed by payment processing logic 416 which can communicate with the financial network 408 to obtain payment from the customer's account.

Figure 5:
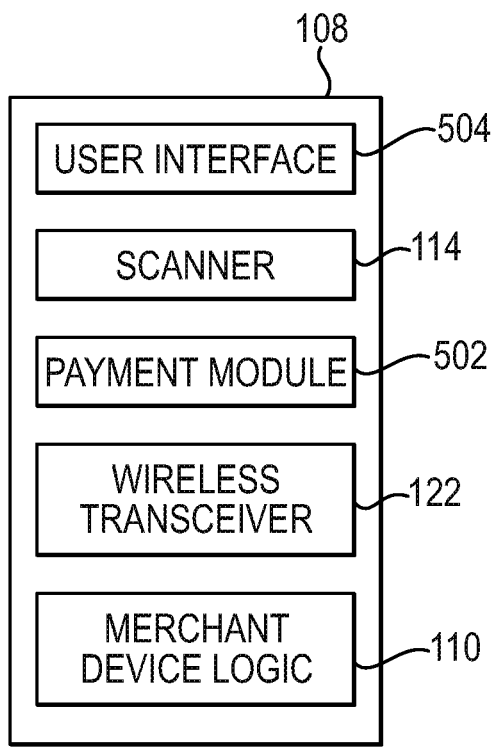
FIG. 5 is a block diagram illustrating an example of a merchant device.

FIG. 5 is a block diagram illustrating an example of a merchant device 108. In an example embodiment, the merchant device 108 comprises merchant device logic 110, a scanner 114, wireless transceiver 122, a payment module 502, and a user interface 504.

As described herein, the scanner 114 may suitably comprise an optical and/or RFID scanner. In an example embodiment, the scanner 114 is operable to scan UPC codes, barcodes, and/or 2-Dimensional barcodes (e.g., QR codes) on tags. In another example the embodiment, the scanner 114 is operable to scan IR tags. In yet another example embodiment, the scanner 114 is operable to scan RFID tags employing any suitable technology, including but not limited to, wireless local area network ("WLAN"), such as WIFI, personal area network ("PAN"), such as BLUETOOTH, and/or a contactless protocol such as NFC. In particular embodiments, the scanner 114 is operable to scan a combination or optical and/or wireless technologies.

In an example embodiment, the wireless transceiver 122 is operable to communicate with customer devices, such as customer device 108. The wireless transceiver may use any suitable wireless technology, such as for example WIFI or BLUETOOTH.

In an example embodiment, the payment module 502 is operable to obtain payment information for items (or goods) scanned by scanner 114. The payment data may be obtained via wireless transceiver 122. In an example embodiment, the payment module 502 is coupled via network 402 (FIG. 4) to merchant payment logic 406 and/or financial networks 408 to process a payment.

In an example embodiment, the user interface 504 is employed to communicate information to the customer. For example, when a payment has been accepted, the payment module 502 may cause a message to be output (displayed and/or audio) indicating the transaction has completed and the customer may exit the checkout area. In another example embodiment, if the mobile cart and physical cart do not match, the user interface 504 can be employed to assist in reconciliation. For example, the user interface may employ a display to output goods scanned by scan 114. In particular embodiments, the display of user interface 504 displays both goods scanned by the scanner 114 and the items that the customer device has indicated were scanned. In an example embodiment, the user interface 504 comprises a keyboard, display, and/or a touch screen enable a customer to request assistance.

In an example embodiment, the user interface further comprises a payment input, such as a card reader, cash acceptor or recycler, check acceptor, or a combination of inputs that can allow the customer to pay for the items and/or pay for additional items (for example additional items determined during reconciliation that were not previously paid for), and/or request the scanner 114 to re-scan the physical cart (for example after removing or adding items to the cart).

In an example embodiment, the merchant device logic 110 obtains data representative of items from tags scanned the (merchant or point of sale or "POS") scanner 114. The merchant device logic 110 receives a request to pay for the items scanned by the scanner 114. The request comprises data representative of a payment amount. The merchant device determines an amount owed from the data representative of items scanned by the scanner 114. The merchant device logic 110 compares the amount owed with the payment amount. The merchant device logic 110 accepts the request to pay for the items scanned by the scanner 114 responsive to determining the amount owed matches the payment amount. In an example embodiment, the merchant device logic 110 causes the payment module 502 to process the payment responsive to determining the amount owed matches the payment amount.

In an example embodiment, the merchant device logic 110 rejects a first request to pay for the items scanned by the scanner 114 responsive to the comparing of the items the scanned 114 (the amount owed) does not match the payment amount. This can occur where the customer may have inadvertently (or maybe intentionally) does not scan an item that is being checked out (e.g., carried by the customer and/or in a cart).

If the amount owed does not match the payment amount, the customer may determine whether an item that was scanned by scanner 114 was not scanned by their customer (e.g., mobile) device. If the customer determines that there was an item that was not scanned by the customer device, the customer may then scan the item with the customer device and adjust the payment accordingly.

Alternatively, the customer may remove an item from their cart (or was being carried by the customer, or even an item that may have been left in the checkout area by a previous customer). The customer may then either using the customer device request a re-scan of the items (which may be requested by the customer via the customer device which would be received by wireless transceiver 122 or via the user interface 504) that will cause the scanner 114 to re-scan the items. The amount owed is updated based on the re-scan of the items. If the payment equals the updated amount owed, merchant device logic 110 will cause the payment module 502 to process the payment.

Figure 6:
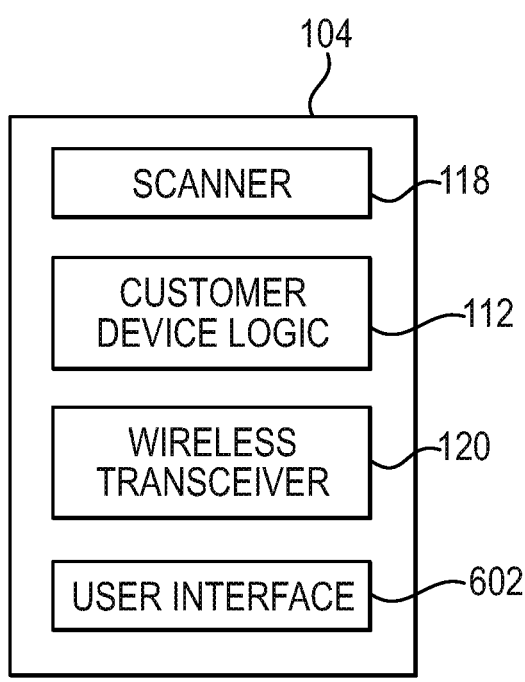
FIG. 6 is a block diagram illustrating an example of a customer device.

FIG. 6 is a block diagram illustrating an example of a customer device 104. In an example embodiment, the customer device 104 comprises customer device logic 112, a scanner 118, a wireless transceiver 120, and a user interface 602.

As described herein, the scanner 118 may suitably comprise an optical and/or RFID scanner. In an example embodiment, the scanner 118 is operable to scan UPC codes, barcodes, and/or 2-Dimensional barcodes (e.g., QR codes) on tags. In another example the embodiment, the scanner 118 is operable to scan IR tags. In yet another example embodiment, the scanner 118 is operable to scan RFID tags employing any suitable technology, including but not limited to, wireless local area network ("WLAN"), such as WIFI, personal area network ("PAN"), such as BLUETOOTH, and/or a contactless protocol such as NFC. In particular embodiments, the scanner 118 is operable to scan a combination or optical and/or wireless technologies.

The customer device logic 112 obtains tag data from scanner 118. The customer device logic 112 maintains a list of items associated with the scanned tags. The item data may be obtained from the tag, or the customer device logic 112 may employ wireless transceiver 120 to obtain data representative of items scanned by scanner 118.

In an example embodiment, the customer employs the user interface 602 to provide payment information. Payment information may be preset (e.g., saved credit card or bank account information) and/or may be input by the customer via the user interface 602. In an example embodiment, the customer can obtain a running total and/or view items scanned for purchase via the user interface 602.

In an example embodiment, the scanner 118 scans a tag of an item for purchase. The tag providing data representative of the item. The customer device logic 112 maintains a current amount due of the scanned item (or items) for purchase. The customer device logic 112 obtains payment for the current amount due. As described herein, the payment data may be preset and/or input by the customer when the customer is done purchasing items. In an example embodiment, a request for payment is received from a merchant computer system via wireless transceiver 120. The customer device logic 112 provides the payment to a merchant computing system responsive to the request for payment via wireless transceiver 120. In particular embodiments, the customer device logic 112 may automatically send payment information upon detecting that the customer device 104 is in a checkout area. In yet another example embodiment, the customer employs user interface 602 to request a payment be sent to the merchant.

In an example embodiment, the scanner 118 scans a plurality of tags of items for purchase, the plurality of tags providing data representative of a plurality of respective items. The customer device logic 112 maintains a current amount due that is updated responsive to scanning each of the plurality of tags.

In an example embodiment, a request is received to remove an item for purchase from the plurality of respective items. For example, the customer may employ user interface 602 to indicate the customer is no longer interested in purchasing a particular item. The customer employs scanner 112 to scan a tag associated with the item to be removed. The customer device logic 112 updates the current amount due responsive to scanning the tag associated with the item to be removed.

In an example embodiment, the customer device logic 112 receives a signal indicating an amount due indicated by a scan of items by a point of sale device does not match the current amount due via wireless transceiver 120. The user interface 602 provides an interface that allows adjusting the amount of payment to match the amount due indicated by the scan by the point of sale device. In another example embodiment, data representative of the items scanned by the merchant is received via wireless transceiver 120. The user interface 602 outputs (either visually or audibly) the items scanned by merchant device. In yet another example embodiment, the user interface provides an interface that allows the customer to request assistance.

In an example embodiment, the customer device logic 112 is operable to send data representative of a tag scanned by scanner 118 to a merchant computing system via wireless transceiver 120. The customer device logic 112 receives data representative of a price for the item from the merchant computer system responsive to sending the data representative of the tag to the merchant computing system via wireless interface 120. In another example embodiment, the data representative of the item obtained from the tag by scanner 118 comprises a price of the item.

Figure 7:
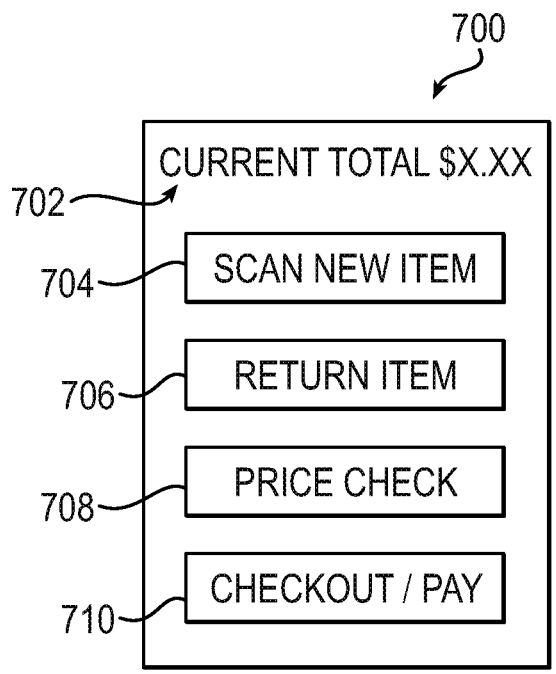
FIG. 7 is a block diagram illustrating an example of a user interface for a customer device.

FIG. 7 is a block diagram illustrating an example of a user interface 700 for a customer device. In an example embodiment, the user interface 700 is employed by user interface 602 of customer device 104. User interface 700 may be implemented on a touch screen interface or on a combination of a display and a keypad.

In an example embodiment, the user interface 700 comprises a current total display 702, s scan new item input 704, remove item input 706, price check input 708, and a checkout/pay input 710. The current total display 702 maintains a current total of the items scanned (mobile cart) for purchase. This can allow a customer to determine if they are over budget. The scan new item input 704 is employed by the customer to add a new item into the mobile cart. The remove item input 706 is employed by the customer to remove an item from the mobile cart. For example, if the customer decides not to purchase something and is removing the item from their cart, the would use the remove item input 706 and then scan the tag associated with the item to remove the item from the mobile cart. The price check input 708 enables the customer to obtain the price of an item which may help in determining whether to purchase the item. The checkout/pay input 710 is can be employed by the customer to initiate checkout (e.g., scanning of the physical cart) and/or provide payment information (e.g., account information).

Figure 8:
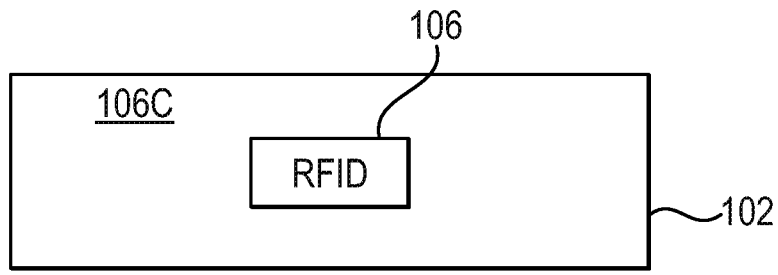
FIG. 8 is a block diagram illustrating an example of an item with a single tag that is scanned by both a customer device and a merchanted device.

FIG. 8 is a block diagram illustrating an example of an item with a RFID tag 106C that is scanned by both a customer device and a merchanted device. For example, the RFID tag 106C may be operable to be scanned by WLAN (e.g., WIFI and/or PAN (e.g., BLUETOOTH) scanners. As those skilled in the art can readily appreciate, RFID tag 106C may employ any suitable wireless technology.

Figure 9:
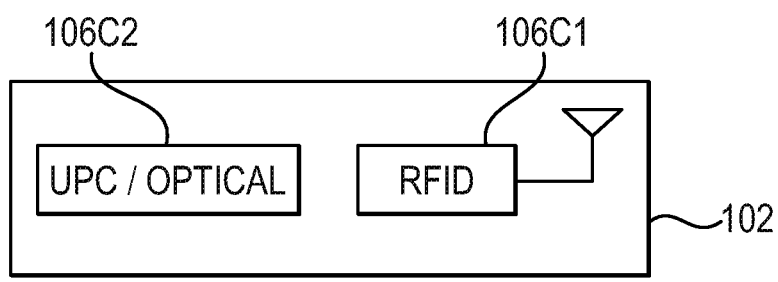
FIG. 9 is a block diagram illustrating an example of an item with an optical tag and a radio frequency identification tag.

FIG. 9 is a block diagram illustrating an example of an item with a radio frequency identification tag 106C1 and optical tag 106C2. For example, the optical tag 106C2 may be scanned by the customer device scanner 118 whereas the RFID tag 106C1 may be scanned by the merchant device scanner 114. Examples of optical technologies that may be employed by tag 106C2 include, but are not limited to, UPC, barcode, QR code, IR or a combination of optical technologies. Examples of RFIC technologies that may be employed by tag 106C1 include, but are not limited to WIFI, BLUETOOTH, or a combination of wireless technologies. Although tags 106C1 and 106C2 are illustrated as separate tags, those skilled in the art can readily appreciate that this is merely for ease of illustration as in an example embodiment tags 106C1 and 106C2 are embodied on the same substrate.

Figure 10:
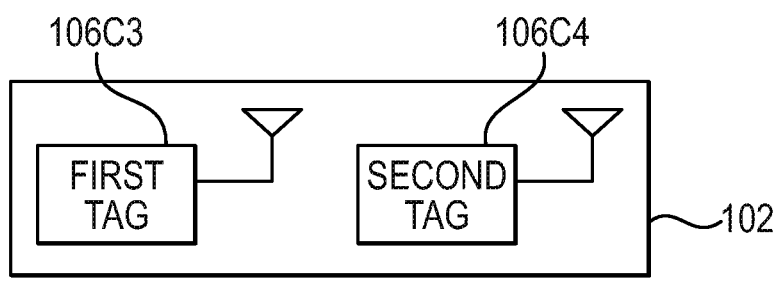
FIG. 10 is a block diagram illustrating an example of an item with a first tag for scanning by a customer device and a second tag for scanning by a merchant device.

FIG. 10 is a block diagram illustrating an example of an item 102 with a first RFID tag 106C3 for scanning by a customer device and a second RFID tag 106C4 for scanning by a merchant device. As those skilled in the art can readily appreciate, different protocols may be employed by tags 106C3 and 106C4. For example, tag 106C3 may comprise one or more of WIFI, BLUETOOTH, NFC and tag 106C4 may comprise one or more of WIFI or BLUETOOTH. For example, the customer may employ NFC (a contactless protocol) to scan a tag associated with the item when putting the item into the mobile cart while the merchant device may employ WIFI (a WLAN protocol) to scan the tag associated with the item for the physical cart. Although tags 106C3 and 106C4 are illustrated as separate tags, those skilled in the art can readily appreciate that this is merely for ease of illustration as in an example embodiment tags 106C3 and 106C4 are embodied on the same substrate.

Although the above descriptions refer to items with tags on them, those skilled in the art should readily appreciate that in some embodiments the tag may be separate from an item. For example, when buying produce, the items may be weighed and a "tag" can be associated with the item which may comprise a barcode or other data that indicates the amount of the purchase (e.g., quantity, price per unit, total price, or a combination thereof). A physical tag may be provided to be placed on the item, however, an example embodiment, the customer device may send data representative of untagged items as part of the reconciliation process.

Figure 11:
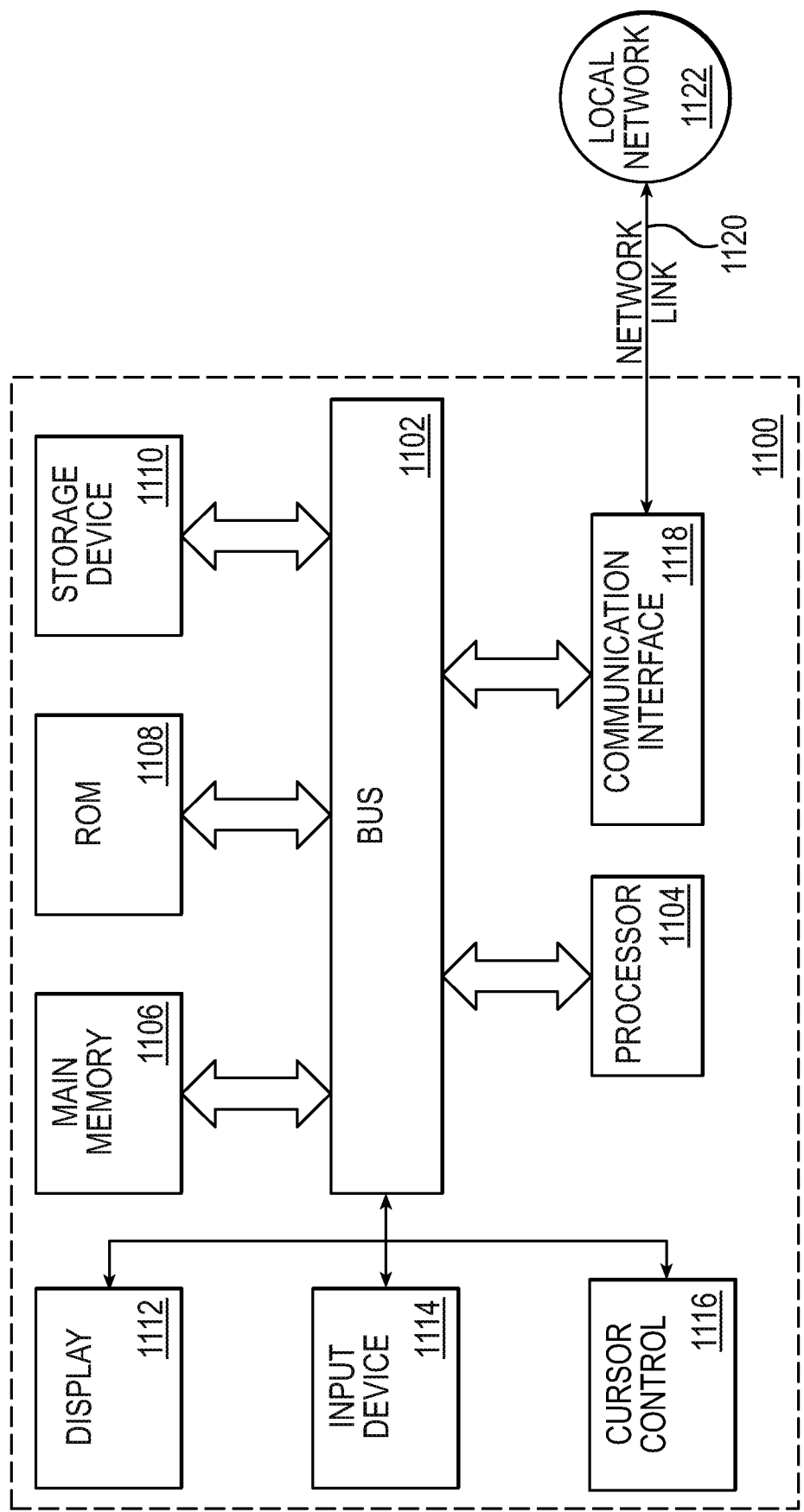
FIG. 11 is a block diagram that illustrates a computer system upon which an example embodiment may be implemented.

FIG. 11 is a block diagram that illustrates a computer system 1100 upon which an example embodiment may be implemented. Computer system 1100 may be employed to implement merchant device logic 110 (FIGS. 1-5) customer device logic 112 (FIGS. 1-4 and 6), and/or payment module 502 (FIG. 5).

Computer system 1100 includes a bus 1102 or other communication mechanism for communicating information and a processor 1104 coupled with bus 1102 for processing information. Computer system 1100 also includes a main memory 1106, such as random access memory (RAM) or other dynamic storage device coupled to bus 1102 for storing information and instructions to be executed by processor 1104. Main memory 1106 also may be used for storing a temporary variable or other intermediate information during execution of instructions to be executed by processor 1104. Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112 such as a cathode ray tube (CRT), liquid crystal display (LCD), light emitting diode (LED) for displaying information to a computer user. An input device 1114, such as a keyboard including alphanumeric and other keys is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g. x) and a second axis (e.g. y) that allows the device to specify positions in a plane. In an example embodiment, the display 1112, input device 114 and/or cursor control 116 may be integrated into a touch screen display.

An aspect of the example embodiment is related to the use of computer system 1100 for. According to an example embodiment, mobile cart reconciliation is provided by computer system 1100 in response to processor 1104 executing one or more sequences of one or more instructions contained in main memory 1106. Such instructions may be read into main memory 1106 from another computer-readable medium, such as storage device 1110. Execution of the sequence of instructions contained in main memory 1106 causes processor 1104 to perform the process steps described herein. One or more processors in a multi-processing arrangement may also be employed to execute the sequences of instructions contained in main memory 1106. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 1104 for execution. Such a medium may take many forms, including but not limited to non-volatile media. Non-volatile media include for example optical or magnetic disks, such as storage device 1110. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

In an example embodiment, computer system 1100 also includes a communication interface 1118 coupled to bus 1102. Communication interface 1118 provides a two-way data communication coupling computer system 1100 to a network link 1120 that is connected to a local network 1122. This enables computer system 1100 to communicate with other external devices. For example communication interface 1118 may allow customer device 104 to communicate with merchant device 108 and visa versa.

Network link 1120 typically provides data communication through one or more networks to other data devices. For example, network link 1120 may comprise one or more wireless and/or wireless links.

In view of the foregoing structural and functional features described above, methodologies in accordance with example embodiments will be better appreciated with reference to FIGS. 12-17. While, for purposes of simplicity of explanation, the methodologies of FIGS. 12-17 are shown and described as executing serially, it is to be understood and appreciated that the example embodiments described herein are not limited by the illustrated orders, as some aspects could occur in different orders and/or concurrently with other aspects from that shown and described herein. Moreover, not all illustrated features described herein may be required to implement a methodology in accordance with an example embodiment. The methodologies described herein are suitably adapted to be implemented in hardware, software when executed by a processor, or a combination thereof.

Figure 12:
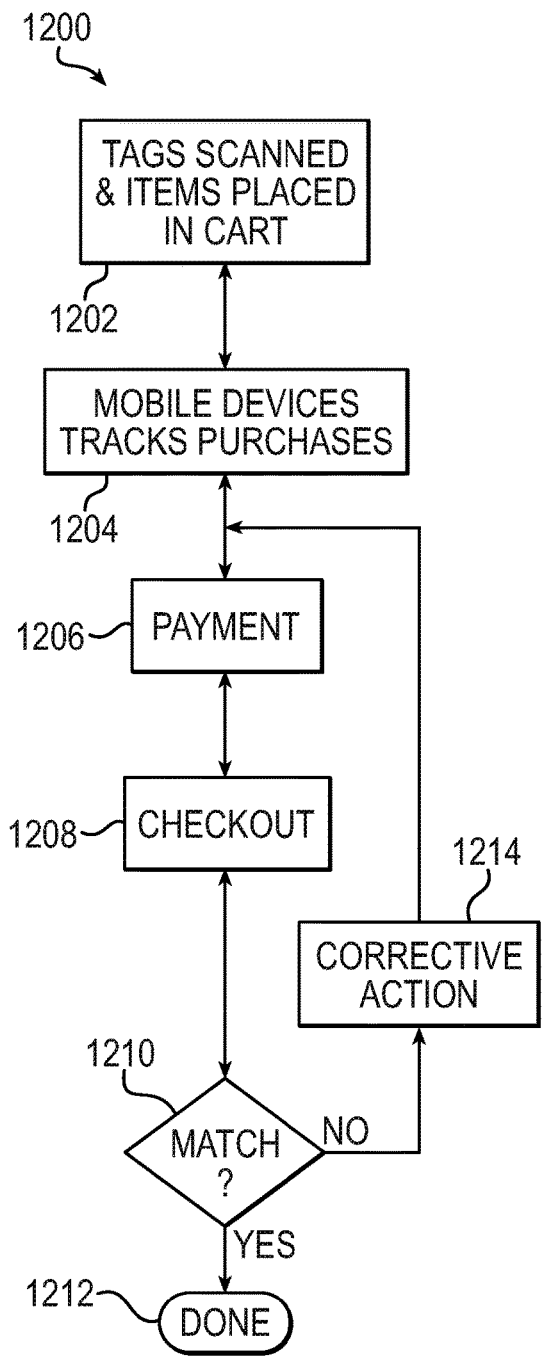
FIG. 12 is a block diagram illustrating a methodology for mobile cart reconciliation where payment is made before checkout.

FIG. 12 is a block diagram illustrating a methodology 1200 for mobile cart reconciliation where payment is made before checkout. As described herein, portions of the methodology 1200 may be performed by merchant device logic 110 (FIGS. 1-5) customer device logic 112 (FIGS. 1-4 and 6), payment module 502 (FIG. 5), and/or computer system 1100 (FIG. 11).

At 1202, data representative of an item is obtained by scanning a tag associated with the item by a device associated with a customer (e.g., customer device 104, such as a mobile device). As described herein, the tag may be any suitable type of tag. The data may include a description of the item (for example brand, model number) and/or pricing information. For example, tag may be an optical tag such as scan a bar code, quick response (QR) code, a Universal Product Code (UPC), or in particular embodiments a combination of two or more of a bar code, QR code, and UPC code. In another example embodiment, the tag is an infra-red (IR) tag. In still another example embodiment, the tag is a Radio Frequency Identification (RFID) scanner that may employ any suitable wireless protocol, such as a contactless protocol (e.g., NFC), a PAN protocol (e.g., BLUETOOTH) or a WLAN protocol (e.g., WI-FI).

In an example embodiment, the data obtained from the tags for like items (e.g., same product) is the same. In another example embodiment, each item, including like items, has a unique tag.

As indicated at 1204, the customer (e.g., mobile) device tracks items for purchase (the mobile cart). If the customer desires to purchase another item, actions 1202 and 1204 are repeated. Actions 1202 and 1204 may be repeated as often as desired by the customer. The customer may purchase any physically realizable number of items.

At 1206, the customer provides payment information. In an example embodiment, the payment information is based on a sum of the items scanned and tracked (the mobile cart). The payment information may include account information (e.g., credit, checking, etc.) which can be debited by the merchant.

At 1208, a merchant device (e.g., merchant device 108 described herein) scans the items brought to a checkout area by the customer (which may be carried to the checkout or be in a cart) by scanning the tags associated with the items by a scanner associated with a point of sale device associated with a merchant (e.g., the physical cart).

At 1210, the merchant device verifies (reconciles) whether the physical cart matches the mobile cart. If the physical cart matches the mobile cart (YES), the payment is accepted and the methodology 1200 is done as indicated by 1212.

However, if at 1210 the mobile cart and the physical cart do not match (NO), then corrective action may be taken as indicated by 1214. For example, a comparison can be made of the mobile cart and physical cart to reconcile the mobile cart and physical cart. If there was an item scanned by the physical cart that is not present in the mobile cart, the customer may have the option to scan a tag associated with the item with the customer device 104 or scan opt to discard the item. The customer also has the option to adjust the payment as indicated by 1206. As another example, if the customer physical cart shows less items than the mobile cart (e.g., the customer may have returned an item to the shelf and forgot to indicate the item was returned in the mobile cart), the customer may adjust the mobile cart.

After corrective action is taken, the physical cart is again scanned and reconciled with the mobile cart. If the mobile cart matches the physical cart (YES) then the payment is accepted and the process is completed as indicated by 1212 otherwise (NO), corrective action can again be taken as indicated by 1214.

Figure 13:
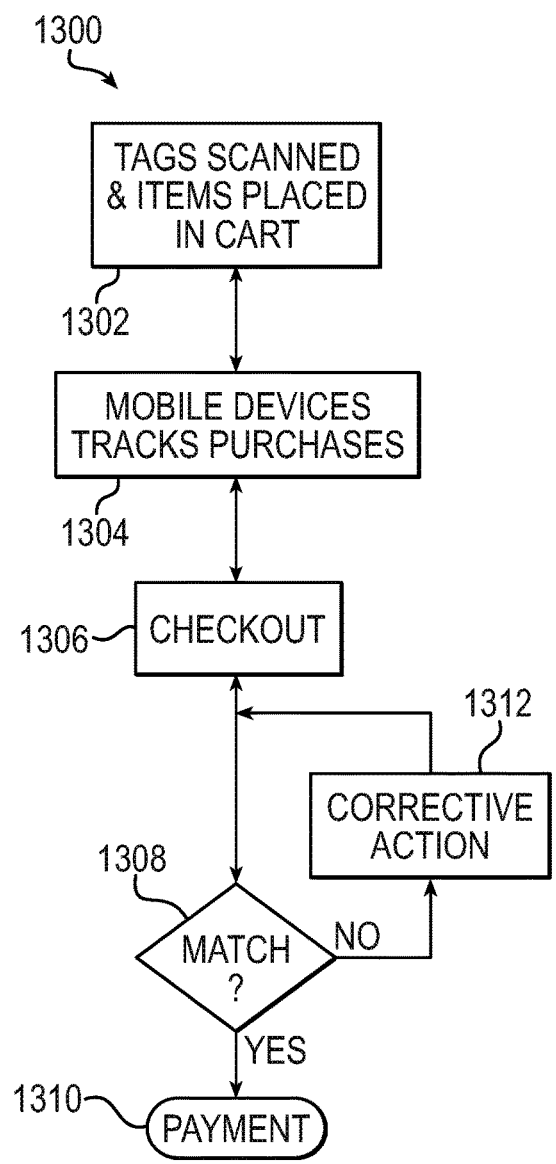
FIG. 13 is a block diagram illustrating a methodology for mobile cart reconciliation where payment is made after checkout.

FIG. 13 is a block diagram illustrating a methodology 1300 for mobile cart reconciliation where payment is made after checkout. As described herein, portions of the methodology 1300 may be performed by merchant device logic 110 (FIGS. 1-5) customer device logic 112 (FIGS. 1-4 and 6), payment module 502 (FIG. 5), and/or computer system 1100 (FIG. 11).

At 1302, data representative of an item is obtained by scanning a tag associated with the item by a device associated with a customer (e.g., customer device 104, such as a mobile device). As described herein, the tag may be any suitable type of tag. The data may include a description of the item (for example brand, model number) and/or pricing information. For example, tag may be an optical tag such as scan a bar code, quick response (QR) code, a Universal Product Code (UPC), or in particular embodiments a combination of two or more of a bar code, QR code, and UPC code. In another example embodiment, the tag is an infra-red (IR) tag. In still another example embodiment, the tag is a Radio Frequency Identification (RFID) scanner that may employ any suitable wireless protocol, such as a contactless protocol (e.g., NFC), a PAN protocol (e.g., BLUETOOTH) or a WLAN protocol (e.g., WI-FI).

In an example embodiment, the data obtained from the tags for like items (e.g., same product) is the same. In another example embodiment, each item, including like items, has a unique tag.

As indicated at 1304, the customer (e.g., mobile) device tracks items for purchase (the mobile cart). If the customer desires to purchase another item, actions 1302 and 1304 are repeated. Actions 1302 and 1304 may be repeated as often as desired by the customer. The customer may purchase any physically realizable number of items.

At 1306, a merchant device (e.g., merchant device 108 described herein) scans the items brought to a checkout area by the customer (which may be carried to the checkout or be in a cart) by scanning the tags associated with the items by a scanner associated with a point of sale device associated with a merchant (e.g., the physical cart).

At 1308, the merchant device verifies (reconciles) whether the physical cart matches the mobile cart. If the physical cart matches the mobile cart (YES), at 1310, the customer provides payment information. In an example embodiment, the payment information is based on a sum of the items scanned and tracked (the mobile cart). The payment information may include account information (e.g., credit, checking, etc.) which can be debited by the merchant.

However, if at 1308 the mobile cart and the physical cart do not match (NO), then corrective action may be taken as indicated by 1312. For example, a comparison can be made of the mobile cart and physical cart to reconcile the mobile cart and physical cart. If there was an item scanned by the physical cart that is not present in the mobile cart, the customer may have the option to scan a tag associated with the item with the customer device 104 or scan opt to discard the item. As another example, if the customer physical cart shows less items than the mobile cart (e.g., the customer may have returned an item to the shelf and forgot to indicate the item was returned in the mobile cart), the customer may adjust the mobile cart.

After corrective action is taken, the physical cart is again scanned and reconciled with the mobile cart. If the mobile cart matches the physical cart (YES) then the payment is obtained at 1310; otherwise (NO), corrective action can again be taken as indicated by 1312.

Figure 14:
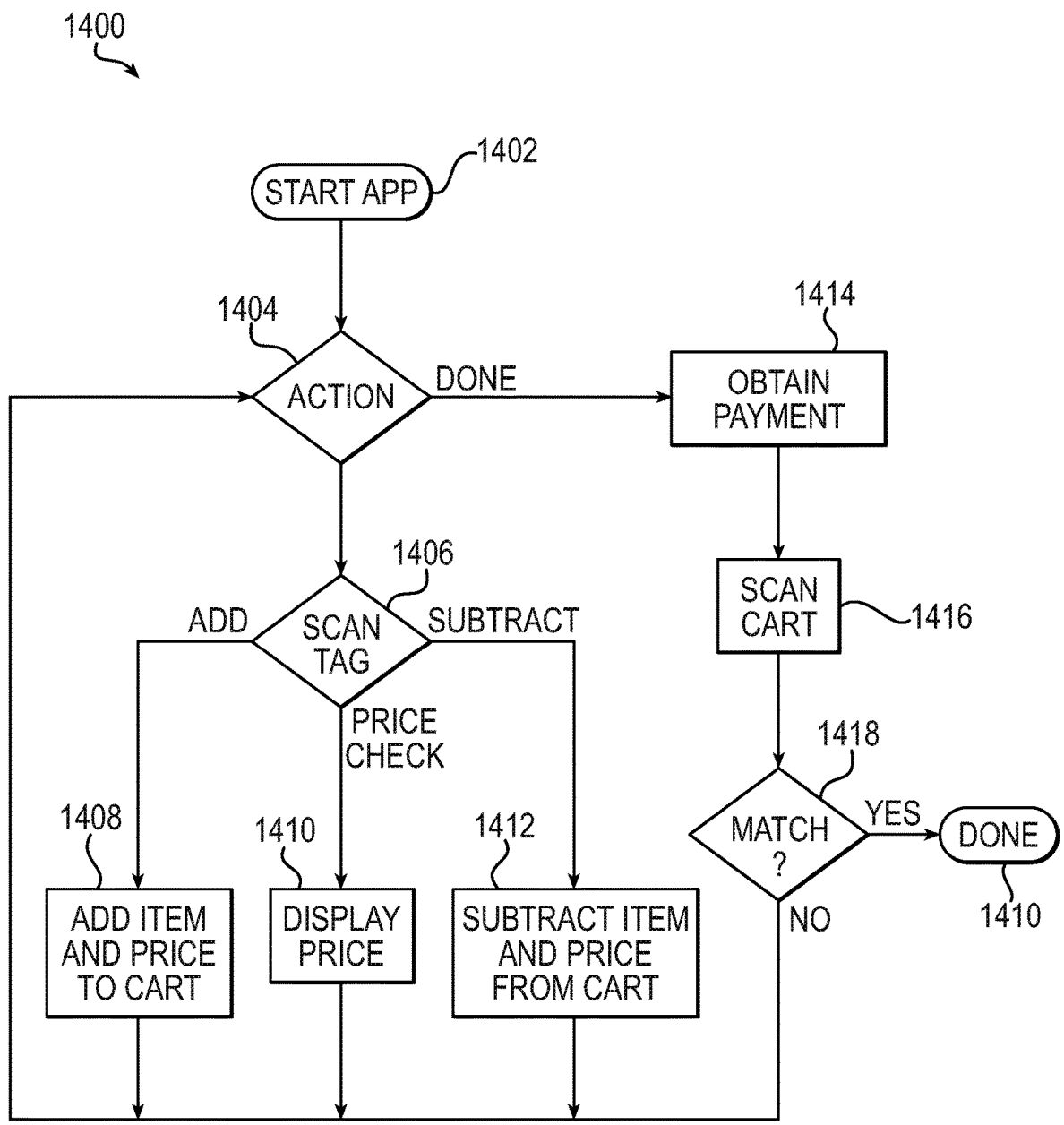
FIG. 14 is a block diagram illustrating a methodology for mobile cart reconciliation performed by device associated with a customer (such as a mobile device) where payment is made before the mobile cart is reconciled with the physical cart.

FIG. 14 is a block diagram illustrating a methodology 1400 for mobile cart reconciliation performed by a device associated with a customer (such as a mobile device) where payment is made before the mobile cart is reconciled with the physical cart. As described herein, the methodology 1400 may be performed by customer device logic 112 (FIGS. 1-4 and 6), payment module 502 (FIG. 5), and/or computer system 1100 (FIG. 11).

At 1402, the application for the customer device (mobile cart) is started. If the application is already running, the mobile cart may be reset.

At 1404, the customer initiates an action. The action may be any action involved in the purchasing process. In the example embodiment illustrated in FIG. 14, the actions may include, but are not limited to, add a new item to the mobile cart, remove (and subtract price) of an item to the mobile cart, request a price check, or signal that purchasing is complete and proceed to checkout.

At 1406, the tag associated with an item is scanned. The tag may be any suitable type of tag such as an optical tag (e.g., UPC code, barcode, and/or QR code) or RFID tag (e.g., NFC, WIFI and/or BLUETOOTH). Once the tag is scanned, the selected action is taken. For example, if the selected action is to add an item to the mobile cart (ADD), the item and the price of the item are added to the mobile cart (which maintains a current amount due of scanned items for purchase) as indicated by 1408. If the selected action was a price check, at 1410 the price of the item is displayed on a display associated with the customer device. If the selected action is to remove (or subtract) an item from the mobile cart, then the item is removed from the mobile cart and its price is subtracted from the total value of items in the mobile cart. Although note shown in FIG. 14, as described herein, the tag does not contain the price of the item, the customer device is operable to communicate with a merchant device to obtain the price. In an example embodiment, the customer device may scan a plurality of tags. A description of the items associated with the tags and current amount due are maintained by the mobile cart.

If, at 1404, the customer indicates they are done shopping (DONE), at 1414 payment for the items in the mobile cart (current amount due) is obtained by the customer device. In an example embodiment, the customer inputs the payment. In another example embodiment, the payment is selected from predefined accounts.

Optionally, at 1416, the customer device may signal the merchant device to scan the mobile cart (i.e., obtain the physical cart). In another example embodiment, the merchant device automatically detects when the mobile cart has moved into a checkout area to initiate scanning the physical cart.

At 1418, the customer device will receive a signal from a device associated with the merchant indicating whether the mobile cart and physical cart matched. If the mobile cart and physical cart match (YES), the payment input at 1414 is sent to the merchant device and the process is completed as indicated by 1420. In an example embodiment, the merchant device sends a signal to the customer device requesting the payment be sent and the customer device sends the payment data to the merchant device responsive to the request.

If, at 1418, the mobile cart and physical cart do not match (NO), processing returns to 1404 where corrective action may be taken by the customer. In an example embodiment, the customer may be provided with a display of either the mobile cart, physical cart, or both to help the customer reconcile the mobile cart and physical cart. For example, if the customer returned an item to the shelf and forgot the remove it from the mobile cart, the customer can update the mobile cart. As another example, if there is an item in the mobile cart that the customer forgot to scan the customer can add the item to the mobile cart. In particular embodiments, the customer is provided with a user interface that allows the customer to request assistance.

Upon reconciling the mobile cart and physical cart, the customer can again indicate they are done at 1404. At 1414, changes to the payment may be input (e.g., if the payment amount changed) and at 1416 the merchant device rescans the physical cart. The actions in FIG. 14, including but not limited to actions 1404, 1414, 1416, and 1418 may be repeated one or more times to complete the transaction.

Figure 15:
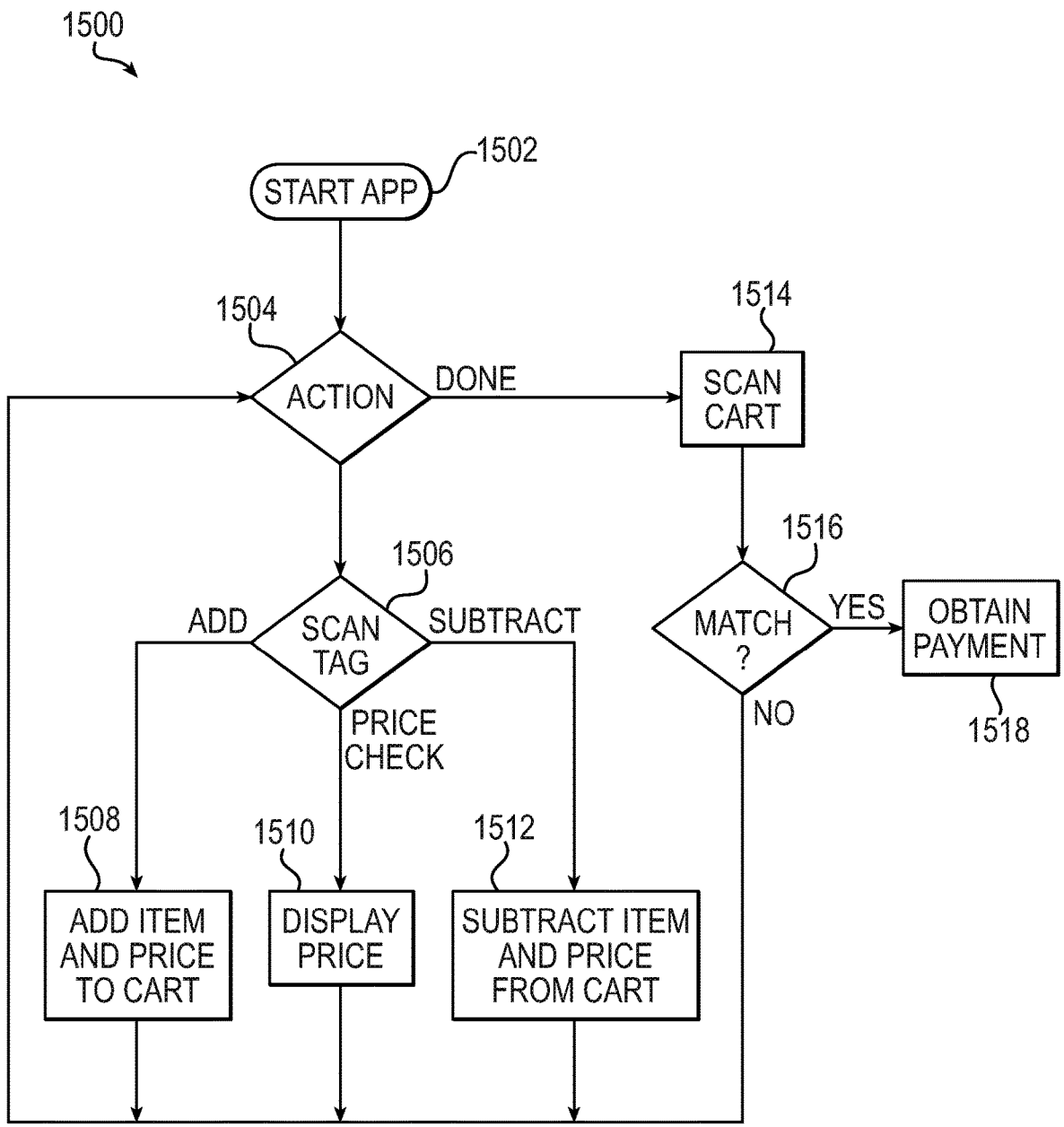
FIG. 15 is a block diagram illustrating a methodology for mobile cart reconciliation performed by a device associated with a customer (such as a mobile device) where payment is made after the mobile cart is reconciled with the physical cart.

FIG. 15 is a block diagram illustrating a methodology 1500 for mobile cart reconciliation performed by a device (such as a mobile device) associated with a customer where payment is made after the mobile cart is reconciled with the physical cart. As described herein, portions of the methodology 1400 may be performed by customer device logic 112 (FIGS. 1-4 and 6), payment module 502 (FIG. 5), and/or computer system 1100 (FIG. 11). As described herein, portions of the methodology 1400 may be performed by customer device logic 112 (FIGS. 1-4 and 6), payment module 502 (FIG. 5), and/or computer system 1100 (FIG. 11).

At 1502, the application for the customer device (mobile cart) is started. If the application is already running, the mobile cart may be reset.

At 1504, the customer initiates an action. The action may be any action involved in the purchasing process. In the example embodiment illustrated in FIG. 15, the actions may include, but are not limited to, add a new item to the mobile cart, remove (and subtract price) of an item to the mobile cart, request a price check, or signal that purchasing is complete and proceed to checkout.

At 1506, the tag associated with an item is scanned. The tag may be any suitable type of tag such as an optical tag (e.g., UPC code, barcode, and/or QR code) or RFID tag (e.g., NFC, WIFI and/or BLUETOOTH). Once the tag is scanned, the selected action is taken. For example, if the selected action is to add an item to the mobile cart (ADD), the item and the price of the item are added to the mobile cart (which maintains a current amount due of scanned items for purchase) as indicated by 1408. If the selected action was a price check, at 1410 the price of the item is displayed on a display associated with the customer device. If the selected action is to remove (or subtract) an item from the mobile cart, then the item is removed from the mobile cart and its price is subtracted from the total value of items in the mobile cart. Although note shown in FIG. 14, as described herein, the tag does not contain the price of the item, the customer device is operable to communicate with a merchant device to obtain the price. In an example embodiment, the customer scans a plurality of tags. A description of the items associated with the scanned tags and the current amount due are maintained by the mobile cart.

If, at 1504, the customer indicates they are done shopping (DONE), optionally at 1514, the customer device may signal the merchant device to scan the mobile cart (i.e., obtain the physical cart). In another example embodiment, the merchant device automatically detects when the mobile cart has moved into a checkout area to initiate scanning the physical cart.

At 1516, the customer device will receive a signal from a device associated with the merchant indicating whether the mobile cart and physical cart matched. If the mobile cart and physical cart match (YES), at 1518 payment for the mobile cart (current amount due) is obtained by the customer device and provided to the merchant device. In an example embedment, the customer device receives a signal from the merchant device requesting the payment and the customer device sends the payment in response to the signal. In an example embodiment, the customer inputs the payment. In another example embodiment, the payment is selected from predefined accounts.

If, at 1516, the mobile cart and physical cart do not match (NO), processing returns to 1504 where corrective action may be taken by the customer. Optionally, the customer may be provided with a display of either the mobile cart, physical cart, or both to help the customer reconcile the mobile cart and physical cart. For example, if the customer returned an item to the shelf and forgot the remove it from the mobile cart, the customer can update the mobile cart. As another example, if there is an item in the mobile cart that the customer forgot to scan the customer can add the item to the mobile cart. In particular embodiments, the customer is provided with a user interface that allows the customer to request assistance from the merchant.

Upon reconciling the mobile cart and physical cart, the customer can again indicate they are done at 1504. At 1514, the merchant device re-scans the physical cart. if the mobile cart and physical cart match (YES) the payment is obtained by the customer device at 1518 and sent to the merchant device. The actions in FIG. 15, including but not limited to actions 1504, 1514, and 1516 may be repeated one or more times to complete the transaction.

Figure 16:
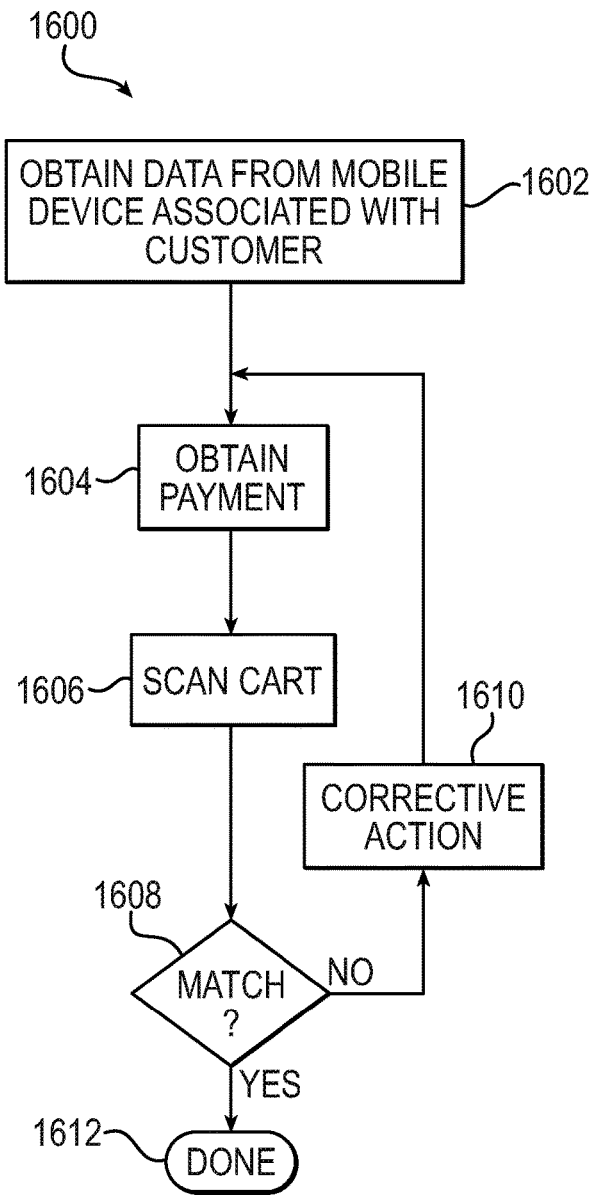
FIG. 16 is a block diagram illustrating a methodology for mobile cart reconciliation performed by a point of sale system associated with a merchant where payment is made before the mobile cart and physical cart are reconciled.

FIG. 16 is a block diagram illustrating a methodology 1600 for mobile cart reconciliation performed by a point of sale (POS) system associated with a merchant where payment is made before the mobile cart and physical cart are reconciled. As described herein, the methodology 1600 may be performed by merchant device logic 110 (FIGS. 1-5) and/or computer system 1100 (FIG. 11).

At 1602, data from a customer device (the mobile cart) associated with a customer is received. The data is representative of one or more items the customer is requesting to purchase. In an example embodiment, the data comprises the current amount due. In particular embodiments, the data comprises a description and price for each item in the mobile cart.

At 1604, payment data is obtained from the customer device. The payment data may comprise financial accounts such as checking or credit card accounts that to debit for payment of the items in the mobile cart. In an example embedment, the merchant device may request the payment data. In particular embodiments, the payment data is sent with the mobile cart data.

At 1606, the items being purchased by the customer (physical cart) are scanned by the merchant device. In an example embodiment, the items are contained within a shopping cart, however, those skilled in the art should readily appreciate that the shopping cart is not necessary as the customer may simply carry the items. In an example embodiment, a signal is received from the customer device to checkout which prompts the scan. In another example embodiment, the scan is automatically performed responsive to detecting the customer in a predefined (e.g., checkout) area.

At 1608, the merchant device compares (reconciles) the mobile cart with the physical cart. If the mobile cart matches the physical cart (YES), the amount owed matches the payment amount and the payment is accepted. The methodology 1600 is completed as indicated at 1612.

If, at 1608, the physical cart does not match the mobile cart (NO), payment for the items is not accepted (the payment is rejected) and corrective action is taken as indicated by 1610. In an example embodiment, the corrective action may include displaying the physical contents of the mobile cart and physical cart to the user to facilitate reconciliation. In another example embodiment, the merchant device sends data representative of the physical cart to the customer device which can allow the customer device to assist in reconciliation. The customer may opt to scan an item into the mobile cart that was in the physical cart but not in the mobile cart, or alternatively, remove the item from the mobile cart. The customer may also opt to remove an item that is in the mobile cart that is not in the physical cart (for example if the customer scanned an item into the mobile cart and later decided not to purchase the item but forgot to remove it from the mobile cart. After the corrective action is taken, the payment information may updated at 1604 (if the payment amount changed) and the physical cart is again scanned at 1606. In an example embodiment, the customer device may send a signal requesting a rescan of the physical cart. As those skilled in the art can readily appreciate, actions 1610, 1604, 1606, and 1608 may be repeated any physically realizable number of times to complete the transaction.

Figure 17:
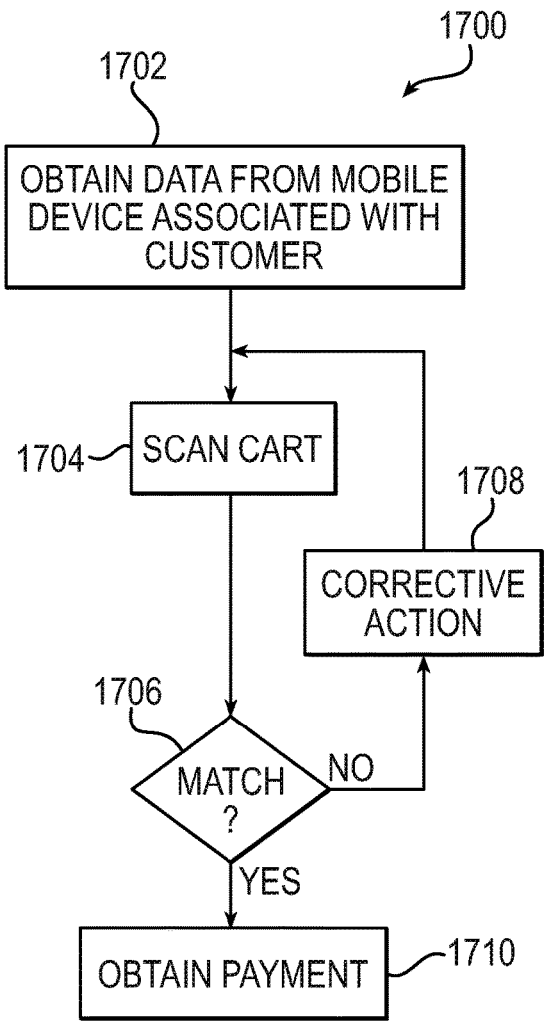
FIG. 17 is a block diagram illustrating a methodology for mobile cart reconciliation performed by a point of sale system associated with a merchant where payment is made after the mobile cart and physical cart are reconciled.

FIG. 17 is a block diagram illustrating a methodology 1700 for mobile cart reconciliation performed by a POS system associated with a merchant where payment is made after the mobile cart and physical cart are reconciled. As described herein, the methodology 1700 may be performed by merchant device logic 110 (FIGS. 1-5) and/or computer system 1100 (FIG. 11).

At 1702, data from a customer device (the mobile cart) associated with a customer is received. The data is representative of one or more items the customer is requesting to purchase. In an example embodiment, the data comprises the current amount due. In particular embodiments, the data comprises a description and price for each item in the mobile cart.

At 1704, the items being purchased by the customer (physical cart) are scanned by the merchant device. In an example embodiment, the items are contained within a shopping cart, however, those skilled in the art should readily appreciate that the shopping cart is not necessary as the customer may simply carry the items. In an example embodiment, a signal is received from the customer device to checkout which prompts the scan. In another example embodiment, the scan is automatically performed responsive to detecting the customer in a predefined (e.g., checkout) area.

At 1706, the merchant device compares (reconciles) the mobile cart with the physical cart. If the mobile cart matches the physical cart (YES), at 1710, payment data is obtained from the customer device. The payment data may comprise financial accounts such as checking or credit card accounts that to debit for payment of the items in the mobile cart. In an example embedment, the merchant device may request the payment data.

If, at 1706, the physical cart does not match the mobile cart (NO), corrective action is taken as indicated by 1708. In an example embodiment, the corrective action may include displaying the physical contents of the mobile cart and physical cart to the user to facilitate reconciliation. In another example embodiment, the merchant device sends data representative of the physical cart to the customer device which can allow the customer device to assist in reconciliation. The customer may opt to scan an item into the mobile cart that was in the physical cart but not in the mobile cart, or alternatively, remove the item from the mobile cart. The customer may also opt to remove an item that is in the mobile cart that is not in the physical cart (for example if the customer scanned an item into the mobile cart and later decided not to purchase the item but forgot to remove it from the mobile cart. After the corrective action is taken, the physical cart is again scanned at 1704. In an example embodiment, the customer device may send a signal requesting a rescan of the physical cart. As those skilled in the art can readily appreciate, actions 1706, 1708, and 1704 may be repeated any physically realizable number of times to complete the transaction. Once the physical cart and mobile cart match, payment is obtained as indicated at 1710.

In the above examples, payment is described as being obtained by the customer device. However, those skilled in the art should readily appreciate that payment may be obtained by the customer device, merchant device, or partial payments may be received by both the customer device and merchant device. Therefore, the example embodiments described herein should not be construed as limited to which device obtains the payment.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. A method for the self-checkout from a merchant retail location by a customer purchasing a plurality of items from the merchant, wherein a mobile cart of the customer is reconciled with a physical cart of the merchant, the method, comprising:

obtaining first data representative of the plurality of items by individually scanning each of the plurality of items for a first time, by an optical scanner associated with a mobile device associated with a customer, a first tag associated with each of the plurality of items, wherein the first tag comprises an optical tag and wherein each item of the plurality of items comprises a second tag comprising a wireless, non-optical tag, wherein the first data comprises a first total price for purchasing the plurality of items;

obtaining, based on the first data, an offer of payment for the plurality of items by the mobile device associated with the customer prior to approaching a predefined checkout area of the merchant, the plurality of items comprising the mobile cart of the customer;

detecting when the customer is within the predefined checkout area of a point of sale device associated with the merchant, wherein a wireless, non-optical scanner is coupled to the point of sale device;

obtaining, by the wireless, non-optical scanner, second data representative of the plurality of items by automatically scanning a physical cart containing the plurality of items scanned for the first time by the customer, the automatic scanning being responsive to detecting that the customer is within the predefined checkout area and comprising a second collective scan of the plurality of items in the physical cart in a single scan, the second collective scan obtaining the second data by scanning the second tag on each item of the plurality of items, the second data comprising a second total price for purchasing the plurality of items;

obtaining, by the point of sale device, the first data representative of the plurality of items scanned for the first time by the optical scanner associated with the mobile device from the mobile device, wherein the obtaining comprises obtaining the mobile cart of the customer;

verifying by the point of sale device that the first data representative of the plurality of items scanned the first time by the mobile device associated with the customer matches the second data representative of the plurality of items scanned the second time by the point of sale device associated with the merchant, wherein the verifying comprises comparing the mobile cart to the physical cart;

accepting the payment from the mobile device associated with the customer by the point of sale device associated with the merchant responsive to verifying that the first data representative of the plurality of items scanned the first time by the mobile device associated with the customer matches the second data representative of the plurality of items scanned the second time by the point of sale device associated with the merchant;

reconciling, responsive to determining that the first data does not match the second data, the first data and the second data, wherein the reconciling comprises:
rejecting the offer of payment from the customer for the plurality of items;
displaying to the customer a graphical user interface on the mobile device associated with the customer comparing the list of items in the mobile cart with the list of items in the physical cart; and
allowing corrective action to be taken by the customer on the graphical user interface to adjust the list of items in the mobile cart until it matches the list of items in the physical cart;
re-scanning for a third time the plurality of items in the physical cart;
verifying that the mobile cart matches the physical cart; and
accepting payment from the customer for the plurality of items.

2. The method according to claim 1, wherein tags for like items selected from the plurality of items are the same.

3. The method according to claim 1, wherein each tag of the plurality of tags has a unique code.

4. The method according to claim 1, wherein the optical tag comprises a Universal Product Code.

5. The method according to claim 1, further comprising:
determining, by the mobile device, that the customer is entitled to a discount for being a member of a loyalty program;
determining, by the point of sale device, that the customer is entitled to the discount; and
verifying by the point of sale device that the first data representative of the item scanned the first time by the mobile device associated with the customer matches the second data representative of the item scanned the second time by the point of sale device associated with the merchant further includes the discount.

* * * * *